(12) United States Patent
Lin

(10) Patent No.: US 11,196,515 B2
(45) Date of Patent: Dec. 7, 2021

(54) HARQ NUMBER DETERMINATION METHOD, NETWORK DEVICE, AND TERMINAL

(71) Applicant: Guangdong OPPO Mobile Telecommunications Corp., Ltd., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/869,485

(22) Filed: May 7, 2020

(65) Prior Publication Data

US 2020/0266933 A1    Aug. 20, 2020

Related U.S. Application Data

(63) Continuation of application No. PCT/CN2018/114444, filed on Nov. 7, 2018.

(30) Foreign Application Priority Data

Nov. 10, 2017 (WO) ................ PCT/CN2017/110583

(51) Int. Cl.
  *H04L 1/18* (2006.01)
  *H04W 72/04* (2009.01)
  (Continued)

(52) U.S. Cl.
  CPC .......... *H04L 1/1812* (2013.01); *H04L 1/1642* (2013.01); *H04L 1/1819* (2013.01);
  (Continued)

(58) Field of Classification Search
  CPC ... H04W 28/04; H04W 72/04; H04W 72/042; H04W 88/08; H04L 5/0007
  (Continued)

(56) References Cited

U.S. PATENT DOCUMENTS

2018/0049229 A1* 2/2018 Dinan ................... H04L 1/1896
2018/0092122 A1* 3/2018 Babaei ................ H04W 72/14
(Continued)

FOREIGN PATENT DOCUMENTS

CN    101132262 A    2/2008
CN    101651529 A    2/2010
(Continued)

OTHER PUBLICATIONS

3GPP TSG-RAN-WG2 Meeting # 99bis, Prague, Czech Republic, Oct. 9-13, 2017, R2-1711431, Revision of R2-1709264, Agenda item: 10.3.1.8, Source: Huawei, HiSilicon, Title: HARQ and Transmission for Type 1 Grant-Free for Active UE. (Year: 2017).*
(Continued)

*Primary Examiner* — Peter G Solinsky
*Assistant Examiner* — Sanjay K Dewan
(74) *Attorney, Agent, or Firm* — Perkins Coie LLP

(57) ABSTRACT

A method for determining a HARQ identifier includes determining, by a network device, a HARQ identifier of a transport block (TB) based on a first time domain resource sequence number of a current TB, a number of HARQ processes, a time domain period of a non-dynamic resource, and a HARQ identifier offset. The method also includes receiving, by the network device, the TB from a terminal on the non-dynamic resource according to the HARQ ID.

16 Claims, 12 Drawing Sheets

---

A terminal determines a time domain resource sequence number of a current transmission and a quantity of HARQ processes, and determines at least one type of the following information: time domain resource configuration information, a HARQ identifier offset, a quantity of transmission times of a current TB, and a first time domain resource sequence number — 201

The terminal determines a HARQ identifier based on the time domain resource sequence number of the current transmission, the quantity of HARQ processes, and the at least one type of the following information: the time domain resource configuration information, the HARQ identifier offset, the quantity of transmission times of the current TB, and the first time domain resource sequence number — 202

(51) Int. Cl.
    *H04W 76/11*     (2018.01)
    *H04W 76/27*     (2018.01)
    *H04L 1/16*     (2006.01)

(52) U.S. Cl.
    CPC ....... *H04W 72/04* (2013.01); *H04W 72/0446* (2013.01); *H04W 76/11* (2018.02); *H04W 76/27* (2018.02)

(58) Field of Classification Search
    USPC .......................................................... 370/329
    See application file for complete search history.

(56) References Cited

U.S. PATENT DOCUMENTS

| | | | | |
|---|---|---|---|---|
| 2018/0176945 | A1* | 6/2018 | Cao | H04W 72/1268 |
| 2018/0323909 | A1* | 11/2018 | Ying | H04L 1/0072 |
| 2020/0266938 | A1* | 8/2020 | Lin | H04W 72/04 |

FOREIGN PATENT DOCUMENTS

| | | | | |
|---|---|---|---|---|
| CN | 102160318 | A | 8/2011 | |
| CN | 103326834 | A | 9/2013 | |
| CN | 103648175 | A | 3/2014 | |
| CN | 106301711 | A | 1/2017 | |
| KR | WO 2010/064805 | A2 * | 6/2010 | H04L 1/18 |
| WO | 2010064805 | A2 | 6/2010 | |

OTHER PUBLICATIONS

3GPP TSG RAN WG1 Meeting #90bis, Prague, Czech Republic, Oct. 9-13, 2017, R1-1717091, Agenda item: 7.3.3.4, Source: Huawei, HiSilicon, Title: UL data transmission procedure with and without UL grant.3GPP (Year: 2017).*

3GPP TSG-RAN WG2 Meeting #99bis, Prague, Czech Republic, Oct. 9-13, 2017, R1-1717091, Agenda item: 7.3.3.4, Source: Huawei, HiSilicon, Title: UL data transmission with and without UL Grant. (Year: 2017).*

International Application No. PCT/CN2017/110583, International search report, dated Apr. 3, 2018, 3 pages.

International Application No. PCT/CN2018/114444, International search report, dated Jan. 21, 2019, 2 pages.

European search report and Written Opinion for related European application No. 17931254.1, dated Sep. 1, 2020 (9 pages).

Huawei et al: "Hard and Transmission for Type 1 Grant-Free for Active UE", 3GPP Draft; R2-1711431 HARQ and Transmission for Type 1 Grant-Free for Active UE, 3rd Generation Partnership Project (3GPP), Mobile Competence Center; 650, Route Des Lucioles; F-06921 Sophia- Antipol, vol. RAN WG2, No. Prague, Czech Republic; Oct. 9, 2017-Oct. 13, 2017 Oct. 8, 2017 (Oct. 8, 2017), XP051343416.

Intel Corporation: "UL data transmission procedures in NR", 3GPP Draft; R1-1717396 Intel-UL GB GF, 3rd Generation Partnership Project (3GPP), Mobile Competence Centre; 650 Route Des Lucioles; F-06921 Sophia-Antipolis Cedex; France, vol. RAN WG1, No. Prague, Czech Republic; Oct. 9, 2017-Oct. 13, 2017 Oct. 8, 2017(Oct. 8, 2017), XP051340586.

Huawei et al:"UL data transmission procedure with and without UL grant", 3GPP Draft; R1-1717091, 3rd Generation Partnership Project (3GPP), Mobile Competence Centre; 650 Route Des Lucioles; F-06921 Sophia-Antipolis Cedex; France, vol. RAN WG1, No. Prague, Czech Republic; Oct. 9, 2017-Oct. 13, 2017 Oct. 8, 2017(Oct. 8, 2017), XP051340282.

3GPP TSG-RAN WG2 Meeting# NR_AdHoc#2—Qingdao, China, Jun. 27-29, 2017—R2-1706645—ZTE, Consideration on the multiple SPS and grant free (5 pages).

Supplementary European Search Report dated Nov. 18, 2020 of European Patent Application No. 18875124.2 (7 pages).

EPO, Examination Report for European Patent Application No. 17931254.1. dated Apr. 1, 2021. 8 pages.

USPTO, Non-Final Office Action for U.S. Appl. No. 16/869,437. dated Aug. 20, 2020. 17 pages.

EPO, Examination Report for European Patent Application No. 18875124.2. dated Aug. 23, 2021. 3 pages.

IPI, Examination Report for Indian Patent Application No. 202017023465. dated Jun. 24, 2021. 7 pages with English translation.

* cited by examiner

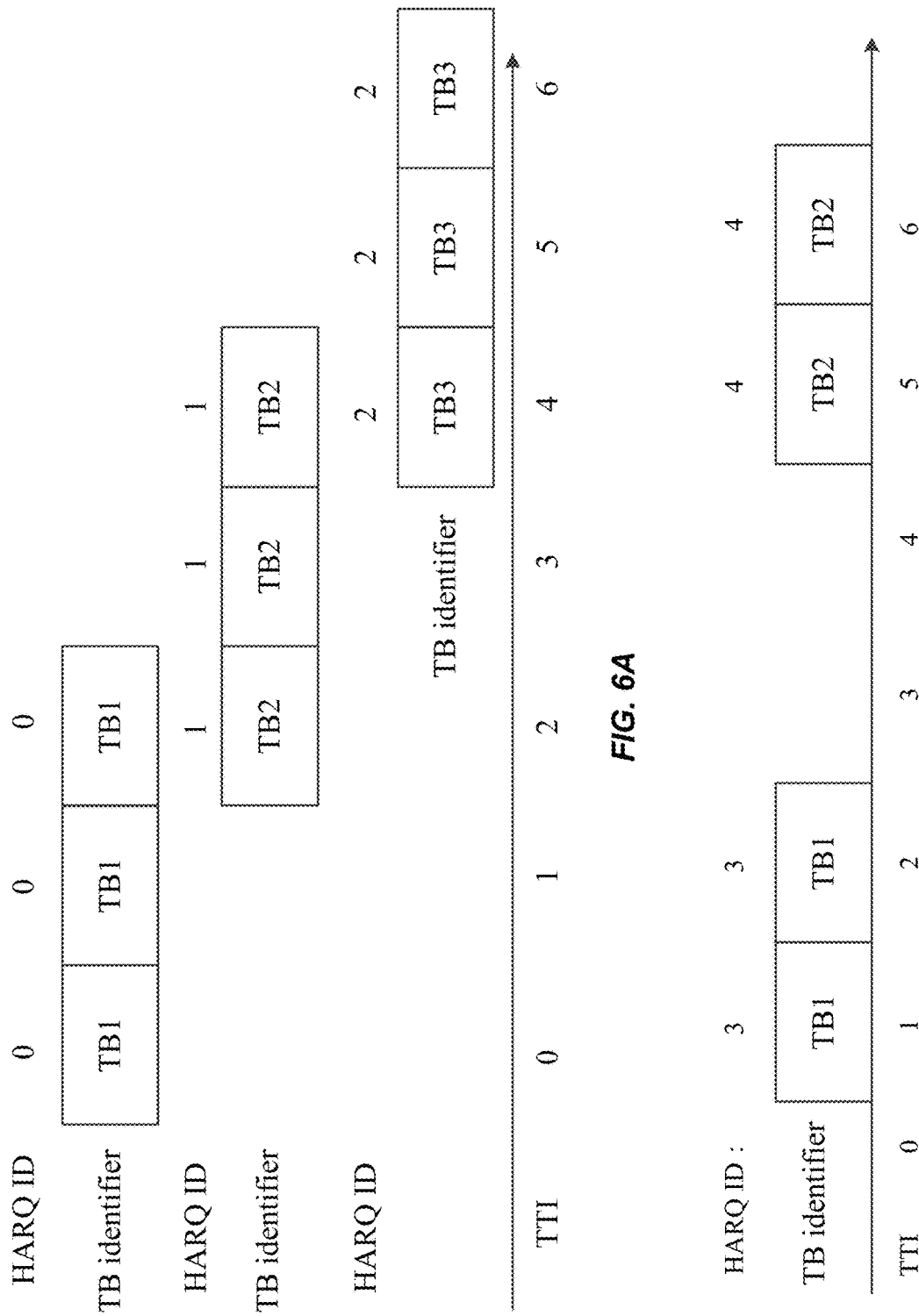

HARQ NUMBER DETERMINATION METHOD, NETWORK DEVICE, AND TERMINAL

CROSS-REFERENCES TO RELATED APPLICATIONS

This application is a continuation of and claims priority to International Patent Application PCT/CN2018/114444, filed Nov. 7, 2018, which claims priority to International Patent Application PCT/CN2017/110583, filed Nov. 10, 2017, the contents of which are hereby incorporated by reference in their entirety.

BACKGROUND OF THE INVENTION

Technical Field

The present invention relates to wireless communications technologies, and specifically to a method for determining a hybrid automatic repeat request (HARQ), identifier, a network device, a terminal, and a computer storage medium.

Related Art

An Ultra-Reliable Low Latency Communication (URLLC) service has been introduced into a current 5G system, and a feature of the service is to implement ultra-reliable transmission (for example, 99.999%) in an extreme latency (for example, 1 ms). To achieve the objective, the Grant-free concept is put forward. The Grant-free concept adopts a pre-configured/semi-persistent resource configuration mode, and a terminal can perform transmission on a configured resource according to a service requirement. This technology avoids a schedule request (SR) and buffer status report (BSR) process, and increases an effective transmission time of the terminal.

A HARQ is usually implemented in a "stop-wait" manner. For a specific HARQ process, a transmission is temporarily suspended before waiting for acknowledgment/negative acknowledgment (ACK/NACK) feedback. After feedback/scheduling signaling is received, a choice is made according to a feedback result/scheduling information to send new data or retransmit old data. To ensure system transmission efficiency, a plurality of processes are adopted for the HARQ. That is, while a process is waiting for feedback/scheduling, other processes are transmitted. To avoid a data disorder among the plurality of processes, a HARQ process is represented by a HARQ identifier (ID).

In a Long Term Evolution (LTE) system, a HARQ ID is obtained by calculation based on a Transmission Time Interval (TTI) identifier, a period, and a number of processes. However, in a 5G system, if retransmission is used in the Grant-free mechanism, a problem of inaccurate HARQ indication may occur. For example, a same transport block (TB) is repeatedly calculated for a plurality of times to obtain different HARQ IDs. In this case, one TB corresponds to a plurality of processes. This not only reduces efficiency of transmission combining, but also causes a problem of incorrect combination of different TBs.

SUMMARY OF THE INVENTION

To resolve the existing technical problems, embodiments of the present invention provide a method for determining a HARQ identifier, a network device, a terminal, and a computer storage medium.

The embodiments of the present invention provide a method for determining a HARQ identifier, including: determining, by a network device, a time domain resource sequence number of a current transmission and a number of HARQ processes, and determining at least one type of the following information: time domain resource configuration information, a HARQ identifier offset, a number of transmission times of a current TB, and a first time domain resource sequence number, where the time domain resource configuration information includes a time domain resource offset and/or a time domain resource period of non-dynamic resource configuration, and the first time domain resource sequence number is determined based on the time domain resource sequence number of the current transmission and/or the number of transmission times of the current TB; and determining, by the network device, a HARQ identifier based on the time domain resource sequence number of the current transmission, the number of HARQ processes, and the at least one type of the following information: the time domain resource configuration information, the HARQ identifier offset, the number of transmission times of the current TB, and the first time domain resource sequence number.

The embodiments of the present invention further provide a method for determining a HARQ identifier, including: determining, by a terminal, a time domain resource sequence number of a current transmission and a number of HARQ processes, and determining at least one type of the following information: time domain resource configuration information, a HARQ identifier offset, a number of transmission times of a current TB, and a first time domain resource sequence number, where the time domain resource configuration information includes a time domain resource offset and/or a time domain resource period, and the first time domain resource sequence number is determined based on the time domain resource sequence number of the current transmission and/or the number of transmission times of the current TB; and determining, by the terminal, a HARQ identifier based on the time domain resource sequence number of the current transmission, the number of HARQ processes, and the at least one type of the following information: the time domain resource configuration information, the HARQ identifier offset, the number of transmission times of the current TB, and the first time domain resource sequence number.

The embodiments of the present invention further provide a terminal device, including: a first determining unit and a second determining unit, where the first determining unit is configured to determine a time domain resource sequence number of a current transmission and a number of HARQ processes, and determining at least one type of the following information: time domain resource configuration information, a HARQ identifier offset, a number of transmission times of a current TB, and a first time domain resource sequence number, where the time domain resource configuration information includes a time domain resource offset and/or a time domain resource period of non-dynamic resource configuration, and the first time domain resource sequence number is determined based on the time domain resource sequence number of the current transmission and/or the number of transmission times of the current TB; and the second determining unit is configured to determine a HARQ identifier based on the time domain resource sequence number of the current transmission, the number of HARQ processes, and the at least one type of the following information: the time domain resource configuration information, the HARQ identifier offset, the number of transmission times of the current TB, and the first time domain resource sequence number that are determined by the first determining unit.

The embodiments of the present invention further provide a terminal, including a third determining unit and a fourth determining unit, where the third determining unit is configured to determine a time domain resource sequence number of a current transmission and a number of HARQ processes, and determining at least one type of the following information: time domain resource configuration information, a HARQ identifier offset, a number of transmission times of a current TB, and a first time domain resource sequence number, where the time domain resource configuration information includes a time domain resource offset and/or a time domain resource period, and the first time domain resource sequence number is determined based on the time domain resource sequence number of the current transmission and/or the number of transmission times of the current TB; and the fourth determining unit is configured to determine a HARQ identifier based on the time domain resource sequence number of the current transmission, the number of HARQ processes, and the at least one type of the following information: the time domain resource configuration information, the HARQ identifier offset, the number of transmission times of the current TB, and the first time domain resource sequence number that are determined by the third determining unit.

The embodiments of the present invention further provide a network device, including a memory, a processor, and a computer program that is stored on the memory and that can be run on the processor, where the processor, when executing the program, implements steps of the method for determining a HARQ identifier that is applied to a network device according to the embodiments of the present invention.

The embodiments of the present invention further provide a terminal, including a memory, a processor, and a computer program that is stored on the memory and that can be run on the processor, where the processor, when executing the program, implements steps of the method for determining a HARQ identifier that is applied to a terminal according to the embodiments of the present invention.

The embodiments of the present invention further provide a computer storage medium, storing a computer instruction, where the instruction, when executed by a processor, implements steps of the method for determining a HARQ identifier that is applied to a network device according to the embodiments of the present invention; or the instruction, when executed by a processor, implements steps of the method for determining a HARQ identifier that is applied to a terminal according to the embodiments of the present invention.

In the method for determining a HARQ identifier, the network device, the terminal, and the computer storage medium that are provided by the embodiments of the present invention, a HARQ identifier is determined by combining at least one type of the following information: time domain resource configuration information serving as a non-dynamic resource, a HARQ identifier offset, a number of transmission times of a current TB, and a first time domain resource sequence number with a time domain resource sequence number of a current transmission and a number of HARQ processes, to avoid a situation that a same transport block corresponds to a plurality of HARQ IDs due to a plurality of transmissions in the Grant free mechanism, so that one transport block corresponds to one process, thereby avoiding a waste of a HARQ processor identifier, avoiding a problem of incorrect combination of different transport blocks, and improving efficiency of retransmission combining.

BRIEF DESCRIPTION OF THE DRAWINGS

FIG. 6A and FIG. 6B are a schematic diagram of a fourth application of a method for determining a HARQ identifier according to an embodiment of the present invention;

DETAILED DESCRIPTION OF THE INVENTION

The following further describes the present disclosure in detail with reference to the accompanying drawings and specific embodiments.

Embodiment 1

Figure 1:
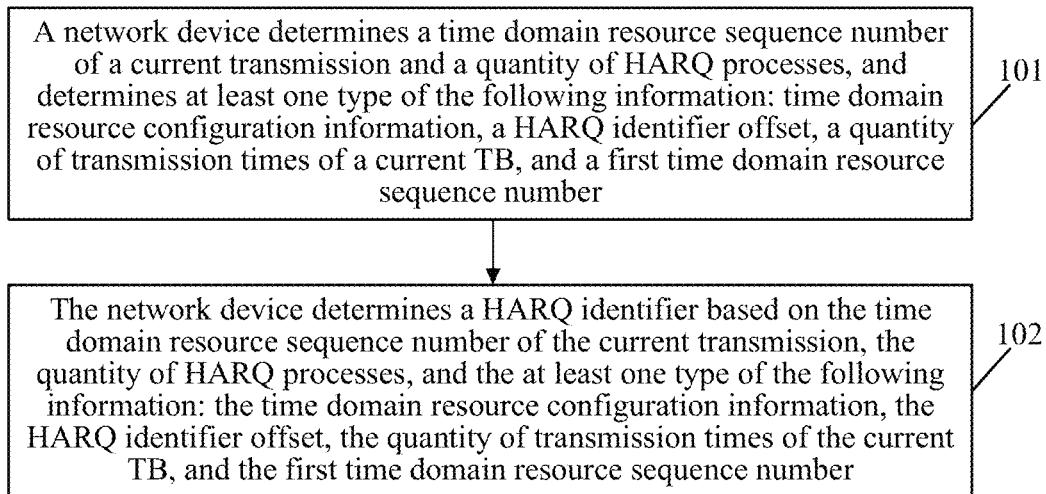
FIG. 1 is a schematic flowchart of a method for determining a HARQ identifier according to Embodiment 1 of the present invention.

This embodiment of the present invention provides a method for determining a HARQ identifier. FIG. 1 is a schematic flowchart of a method for determining a HARQ identifier according to Embodiment 1 of the present invention. As shown in FIG. 1, the method includes:

Step 101: A network device determines a time domain resource sequence number of a current transmission and a number of HARQ processes, and determines at least one type of the following information: time domain resource configuration information, a HARQ identifier offset, a number of transmission times of a current TB, and a first time domain resource sequence number, where the time domain resource configuration information includes a time domain resource offset and/or a time domain resource period of non-dynamic resource configuration.

Step 102: The network device determines a HARQ identifier based on the time domain resource sequence number of the current transmission, the number of HARQ processes, and the at least one type of the following information: the time domain resource configuration information, the HARQ identifier offset, the number of transmission times of the current TB, and the first time domain resource sequence number.

In this embodiment of the present invention, the time domain resource sequence number may be any one of a radio frame number, a subframe number, a slot number, and a symbol number.

In this embodiment of the present invention, the first time domain resource sequence number may be determined based on the time domain resource sequence number of the current transmission and/or the number of transmission times of the current TB. In an example, the first time domain resource sequence number=the time domain resource sequence number of the current transmission−the number of transmission times of the current TB. That is, the first time domain resource sequence number may be determined by subtracting the number of transmission times of the current TB from the time domain resource sequence number of the current transmission.

In a first implementation, the network device determines a time domain resource sequence number of a current transmission, a time domain resource offset, a time domain resource period, and a number of HARQ processes, and then determines a HARQ identifier based on the time domain resource sequence number of the current transmission, the time domain resource offset, the time domain resource period, and the number of HARQ processes.

In a second implementation, if the network device determines a time domain resource sequence number of a current transmission, a time domain resource offset, a time domain resource period, number of HARQ processes, and a HARQ identifier offset, and then determines a HARQ identifier based on the time domain resource sequence number of the current transmission, the time domain resource offset, the time domain resource period, and the number of HARQ processes.

In a third implementation, the network device determines a time domain resource sequence number of a current transmission, a time domain resource period, a number of HARQ processes, and a HARQ identifier offset, and determines a HARQ identifier based on the time domain resource sequence number of the current transmission, the time domain resource period, the number of HARQ processes, and the HARQ identifier offset.

In a fourth implementation, the network device determines a time domain resource sequence number of a current transmission, a time domain resource offset, a number of transmission times of a current TB, a time domain resource period, a number of HARQ processes, and a HARQ identifier offset, and determines a HARQ identifier based on time domain resource sequence number of the current transmission, the time domain resource offset, the number of transmission times of the current TB, the time domain resource period, the number of HARQ processes, and the HARQ identifier offset.

In a fifth implementation, the network device determines a time domain resource sequence number of a current transmission, a number of transmission times of a current TB, a time domain resource period, a number of HARQ processes, and a HARQ identifier offset, and determines the HARQ identifier based on the time domain resource sequence number of the current transmission, the number of transmission times of the current TB, the time domain resource period, the number of HARQ processes, and the HARQ identifier offset.

In a sixth implementation, the network device determines a time domain resource sequence number of a current transmission, a number of transmission times of a current TB, a time domain resource period, and a number of HARQ processes, and determines a HARQ identifier based on the time domain resource sequence number of the current transmission, the number of transmission times of the current TB, the time domain resource period, and the number of HARQ processes.

In a seventh implementation, the network device determines a time domain resource sequence number of a current transmission, a number of transmission times of a current TB, a time domain resource period, and a number of HARQ processes, and determines a HARQ identifier based on the time domain resource sequence number of the current transmission, the time domain resource offset, the number of transmission times of the current TB, the time domain resource period, and the number of HARQ processes.

In an eighth implementation, the network device determines a first time domain resource sequence number, a time domain resource offset, a time domain resource period, a number of HARQ processes, and a HARQ identifier offset, and determines a HARQ identifier based on the first time domain resource sequence number, the time domain resource offset, the time domain resource period, the number of HARQ processes, and the HARQ identifier offset.

In a ninth implementation, the network device determines a first time domain resource sequence number, a time domain resource period, a number of HARQ processes, a HARQ identifier offset, and determines a HARQ identifier based on the first time domain resource sequence number, the time domain resource period, the number of HARQ processes, and the HARQ identifier offset.

In a tenth implementation, the network device determines a first time domain resource sequence number, a time domain resource period, and a number of HARQ processes, and determines a HARQ identifier based on the first time domain resource sequence number, the time domain resource period, and the number of HARQ processes.

In an eleventh implementation, the network device determines a first time domain resource sequence number, a time domain resource offset, a time domain resource period, and a number of HARQ processes, and determines a HARQ identifier based on the first time domain resource sequence number, the time domain resource offset, the time domain resource period, and the number of HARQ processes.

In this embodiment of the present invention, a unit of the time domain resource offset is the same as or different from an absolute time length of a transmission.

In this embodiment of the present invention, a unit of the time domain resource period is the same as or different from an absolute time length of a transmission.

By using the technical solutions of the embodiments of the present invention, a HARQ identifier is determined by combining at least one type of the following information: time domain resource configuration information serving as a non-dynamic resource, a HARQ identifier offset, and a number of transmission times of a current TB with a time domain resource sequence number of a current transmission and a number of HARQ processes, to avoid a situation that a same transport block corresponds to a plurality of HARQ IDs due to a plurality of transmissions in the Grant free mechanism, so that one TB corresponds to one process, thereby avoiding a waste of a HARQ processor identifier, avoiding a problem of incorrect combination of different TBs, and improving efficiency of retransmission combining.

Embodiment 2

Figure 2:
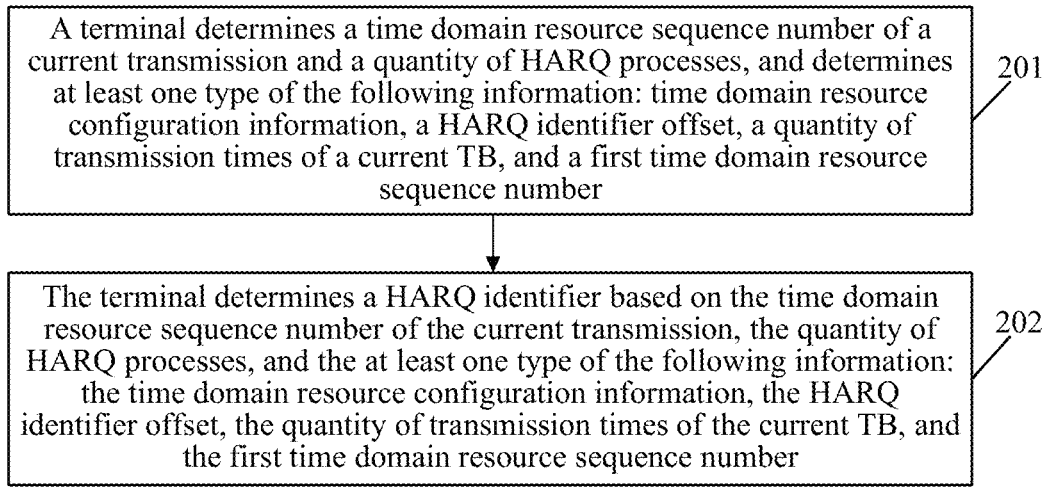
FIG. 2 is a schematic flowchart of a method for determining a HARQ identifier according to Embodiment 2 of the present invention.

This embodiment of the present invention further provides a method for determining a HARQ identifier. FIG. 2 is a schematic flowchart of a method for determining a HARQ identifier according to Embodiment 2 of the present invention. As shown in FIG. 2, the method includes:

Step 201: A terminal determines a time domain resource sequence number of a current transmission and a number of HARQ processes, and determines at least one type of the following information: time domain resource configuration information, a HARQ identifier offset, a number of transmission times of a current TB, and a first time domain resource sequence number, where the time domain resource configuration information includes a time domain resource offset and/or a time domain resource period.

Step 202: The terminal determines a HARQ identifier based on the time domain resource sequence number of the current transmission, the number of HARQ processes, and the at least one type of the following information: the time domain resource configuration information, the HARQ identifier offset, the number of transmission times of the current TB, and the first time domain resource sequence number.

In this embodiment of the present invention, the time domain resource sequence number may be any one of a radio frame number, a subframe number, a slot number, and a symbol number.

In this embodiment of the present invention, the first time domain resource sequence number may be determined based on the time domain resource sequence number of the current transmission and/or the number of transmission times of the current TB. In an example, the first time domain resource sequence number=the time domain resource sequence number of the current transmission−the number of transmission times of the current TB. That is, the first time domain resource sequence number may be determined by subtracting the number of transmission times of the current TB from the time domain resource sequence number of the current transmission.

In this embodiment of the present invention, the method further includes: receiving, by the terminal, signaling from a network device, where the signaling carries at least one type of the following information: the number of HARQ processes, the time domain resource configuration information, and the HARQ identifier offset; and the signaling includes one type of the following: RRC signaling, higher layer signaling, or physical layer signaling.

In a first implementation, the terminal determines a time domain resource sequence number of a current transmission, a time domain resource offset, a time domain resource period, the number of HARQ processes, and then determines a HARQ identifier based on the time domain resource sequence number of the current transmission, the time domain resource offset, the time domain resource period, and the number of HARQ processes.

In a second implementation, the terminal determines a time domain resource sequence number of a current transmission, a time domain resource offset, a time domain resource period, a number of HARQ processes, and a HARQ identifier offset, and then, determines a HARQ identifier based on the time domain resource sequence number of the current transmission, the time domain resource offset, the time domain resource period, and the number of HARQ processes.

In a third implementation, the terminal determines a time domain resource sequence number of a current transmission, a time domain resource period, a number of HARQ processes, and a HARQ identifier offset, and determines a HARQ identifier based on the time domain resource sequence number of the current transmission, the time domain resource period, the number of HARQ processes, and the HARQ identifier offset.

In a fourth implementation, the terminal determines a time domain resource sequence number of a current transmission, a time domain resource offset, a number of transmission times of a current TB, a time domain resource period, a number of HARQ processes, and a HARQ identifier offset, and determines a HARQ identifier based on the time domain resource sequence number of the current transmission, the time domain resource offset, the number of transmission times of the current TB, the time domain resource period, the number of HARQ processes, and the HARQ identifier offset.

In a fifth implementation, the terminal determines a time domain resource sequence number of a current transmission, a number of transmission times of a current TB, a time domain resource period, a number of HARQ processes, and a HARQ identifier offset, and determines a HARQ identifier based on the time domain resource sequence number of the current transmission, the number of transmission times of the current TB, the time domain resource period, the number of HARQ processes, and the HARQ identifier offset.

In a sixth implementation, the terminal determines a time domain resource sequence number of a current transmission, a number of transmission times of a current TB, a time domain resource period, and a number of HARQ processes, and determines a HARQ identifier based on the time domain resource sequence number of the current transmission, the number of transmission times of the current TB, the time domain resource period, and the number of HARQ processes.

In a seventh implementation, the terminal determines a time domain resource sequence number of a current transmission, a number of transmission times of a current TB, a time domain resource period, and a number of HARQ processes, and determines a HARQ identifier based on the time domain resource sequence number of the current transmission, the time domain resource offset, the number of transmission times of the current TB, the time domain resource period, and the number of HARQ processes.

In an eighth implementation, the terminal determines a first time domain resource sequence number, a time domain resource offset, a time domain resource period, a number of HARQ processes, and a HARQ identifier offset, and determines a HARQ identifier based on the first time domain resource sequence number, the time domain resource offset, the time domain resource period, the number of HARQ processes, and the HARQ identifier offset.

In a ninth implementation, the terminal determines a first time domain resource sequence number, a time domain resource period, a number of HARQ processes, a HARQ identifier offset, and determines a HARQ identifier based on the first time domain resource sequence number, the time domain resource period, the number of HARQ processes, and the HARQ identifier offset.

In a tenth implementation, the terminal determines a first time domain resource sequence number, a time domain resource period, and a number of HARQ processes, and determines a HARQ identifier based on the first time domain resource sequence number, the time domain resource period, and the number of HARQ processes.

In an eleventh implementation, the terminal determines a first time domain resource sequence number, a time domain resource offset, a time domain resource period, and a number of HARQ processes, and determines a HARQ identifier based on the first time domain resource sequence number, the time domain resource offset, the time domain resource period, and the number of HARQ processes.

In this embodiment of the present invention, a unit of the time domain resource offset is the same as or different from an absolute time length of a transmission.

In this embodiment of the present invention, a unit of the time domain resource period is the same as or different from an absolute time length of a transmission.

By using the technical solutions of the embodiments of the present invention, a HARQ identifier is determined by combining at least one type of the following information: time domain resource configuration information serving as a non-dynamic resource, a HARQ identifier offset, and a number of transmission times of a current TB with a time domain resource sequence number of a current transmission and a number of HARQ processes, to avoid a situation that a same transport block corresponds to a plurality of HARQ IDs due to a plurality of transmissions in the Grant free mechanism, so that one TB corresponds to one process, thereby avoiding a waste of a HARQ processor identifier, avoiding a problem of incorrect combination of different TBs, and improving efficiency of retransmission combining.

The method for determining a HARQ identifier in the embodiments of the present invention is described below with reference to specific application scenarios.

Scenario 1

This scenario is determining a HARQ identifier based on a time domain resource sequence number of a current transmission, a time domain resource offset, a time domain resource period, and a number of HARQ processes. The technical solution of this scenario avoids a situation that a same transport block corresponds to a plurality of HARQ IDs due to a plurality of transmissions. In an example, the HARQ identifier satisfies the following expression:

$$\text{HARQ Process ID} = [\text{floor}((t\_temp - \text{Toffset\_temp})/T\_temp)] \text{modulo } B \quad (1)$$

where HARQ Process ID is a HARQ identifier, t represents a time domain resource sequence number of a current transmission, Toffset represents a time domain resource offset, T represents a time domain resource period, and B represents a number of HARQ processes; floor represents rounding down, and certainly, in another manner, processing may be performed through a rounding up operation; and modulo represents modulo operation. t_temp, Toffset_temp, and T_temp are respectively parameters obtained by converting t, Toffset, and T based on a specific time unit, absolute time units of t_temp, Toffset_temp, and T_temp are the same, and absolute time units of t, Toffset, and T may be the same or different.

Figure 3A:
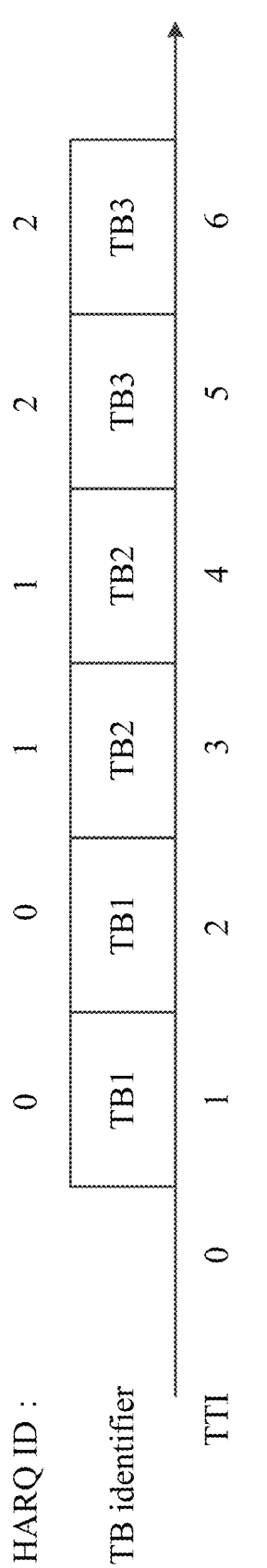
FIG. 3A and FIG. 3B are a schematic diagram of a first application of a method for determining a HARQ identifier according to an embodiment of the present invention.
Figure 3B:
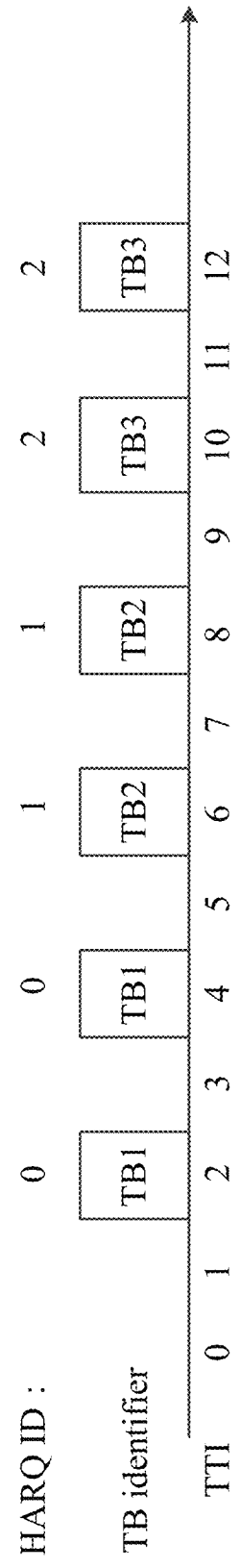

FIG. 3A and FIG. 3B are a schematic diagram of a first application of a method for determining a HARQ identifier according to an embodiment of the present invention. As shown in FIG. 3A, in a scenario in which units of Toffset and T are the same as an absolute time length of a transmission, for example: T=2 ms (2 slots), Toffset=1 ms (1 slot), a number of processes is 3, and an absolute time length of one transmission is 1 ms (1 slot), Toffset_temp=Toffset, T_temp=T, a HARQ ID obtained by calculation based on the expression (1) satisfies:

$$\text{HARQ Process ID} = [\text{floor}((t-1)/2)] \text{modulo } 3$$

so that when t=1, 2, HARQ Process ID=0; when t=3, 4, HARQ Process ID=1; and when t=5, 6, HARQ Process ID=2.

In the foregoing scenario, a starting identifier of a HARQ is 0, and if the starting identifier of the HARQ process is not 0, an offset is added based on the foregoing expression (1). For example, the starting identifier of the HARQ process is 1, a HARQ ID satisfies:

$$\text{HARQ Process ID} = [\text{floor}((t\_temp - \text{Toffset\_temp})/T\_temp)] \text{modulo } B + 1$$

As shown in FIG. 3B, in a scenario in which units of Toffset and T are different from an absolute time length of a transmission, for example: T=2 ms (2 slots), Toffset=1 ms (1 slot), a number of processes is 3, and an absolute time length of one transmission is 0.5 ms (0.5 slot), Toffset_temp=1/0.5=2, T_temp=2/0.5=4, a HARQ ID obtained by calculation based on the expression (1) satisfies:

$$\text{HARQ Process ID} = [\text{floor}((t-2)/4)] \text{modulo } 3$$

so that when t=2, 4, HARQ Process ID=0; when t=6, 8, HARQ Process ID=1; and when t=10, 12, HARQ Process ID=2.

In the foregoing scenario, a starting identifier of a HARQ is 0, and if the starting identifier of the HARQ process is not 0, an offset is added based on the foregoing expression (1). For example, the starting identifier of the HARQ process is 1, a HARQ ID satisfies:

$$\text{HARQ Process ID} = [\text{floor}((t\_temp - \text{Toffset\_temp})/T\_temp)] \text{modulo } B + 1$$

In this embodiment of the present invention, T represents an interval between two transmissions that are not automatic retransmissions.

Scenario 2

This scenario is determining a HARQ identifier based on a time domain resource sequence number of a current transmission, a time domain resource offset, a time domain resource period, a number of HARQ processes, and a HARQ identifier offset. The technical solution of this scenario is applied to a scenario configured with a plurality of Grant free resources, in which a problem of HARQ ID overlapping exists. In an example, the HARQ identifier satisfies the following expression:

$$\text{HARQ Process ID} = [\text{floor}((t\_temp - \text{Toffset\_temp})/T\_temp)] \text{modulo } B + \text{Hoffset} \quad (2)$$

where HARQ Process ID is a HARQ identifier, t represents a time domain resource sequence number of a current transmission, Toffset represents a time domain resource offset, T represents a time domain resource period, and B represents a number of HARQ processes; Hoffset represents a HARQ ID offset; floor represents rounding down, and certainly, in another manner, processing may be performed through a rounding up operation; and modulo represents modulo operation. t_temp, Toffset_temp, and T_temp are respectively parameters obtained by converting t, Toffset, and T based on a specific time unit, absolute time units of t_temp, Toffset_temp, and T_temp are the same, and absolute time units of t, Toffset, and T may be the same or different.

Figure 4A:
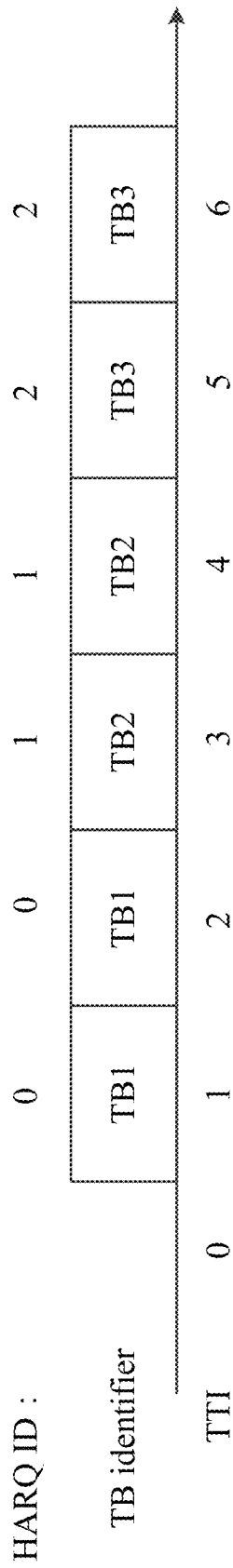
FIG. 4A and FIG. 4B are a schematic diagram of a second application of a method for determining a HARQ identifier according to an embodiment of the present invention.
Figure 4B:
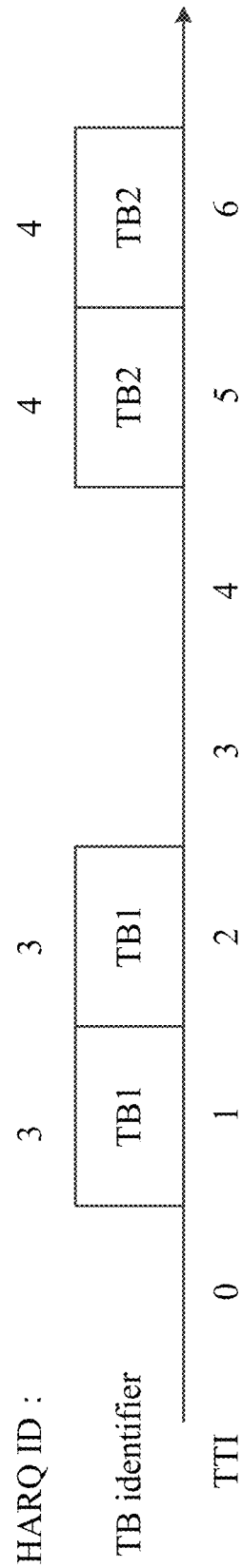

FIG. 4A and FIG. 4B are a schematic diagram of a second application of a method for determining a HARQ identifier according to an embodiment of the present invention. As shown in FIG. 4A and FIG. 4B, in a scenario in which units of Toffset and T are the same as an absolute time length of a transmission, two Grant free resources are configured, where Grant free resource 1: T1=2 ms (2 slots), Toffset1=1 ms (1 slot), a number of processes is 3, and Hoffset=0, and Grant free resource 2: T2=2 ms (2 slots), Toffset2=1 ms (1 slot), a number of processes is 2, and Hoffset=3, and an absolute time length of one transmission is 1 ms (1 slot), HARQ IDs respectively obtained by performing calculation for the Grant free resource 1 and the Grant free resource 2 based on the expression (2) satisfy:

HARQ Process ID for Grant free 1=[floor(($t$−1)/2)] modulo 3

HARQ Process ID for Grant free 2=[floor(($t$−1)/4)] modulo 2+3 so that for the Grant free resource 1, as shown in FIG. 4A, when t=1, 2, HARQ Process ID=0; and when t=3, 4, HARQ Process ID=1; and when t=5, 6, HARQ Process ID=2; and so that for the Grant free resource 2, as shown in FIG. 4B, when t=1, 2, HARQ Process ID=3; and when t=5, 6, HARQ Process ID=4.

In the foregoing scenario, a starting identifier of a HARQ is 0, and if the starting identifier of the HARQ process is not 0, an offset is added based on the foregoing expression (2). For example, the starting identifier of the HARQ process is 1, a HARQ ID satisfies:

HARQ Process ID=[floor((t_temp−Toffset_temp)/ T_temp)]modulo $B$+Hoffset+1

The foregoing example is a scenario in which units of Toffset and T are the same as an absolute time length of a transmission. For a scenario in which units of Toffset and T are the different from an absolute time length of a transmission, refer to descriptions on converting Toffset and T shown in FIG. 3B. Examples are not described again in this scenario.

In this embodiment of the present invention, T represents an interval between two transmissions that are not automatic retransmissions.

Scenario 3

This scenario is determining a HARQ identifier based on a time domain resource sequence number of a current transmission, a time domain resource period, a number of HARQ processes, and a HARQ identifier offset. In an example, the HARQ identifier satisfies the following expression:

HARQ Process ID=[floor(t_temp/T_temp)]modulo $B$+Hoffset    (3)

where HARQ Process ID is a HARQ identifier, t represents a time domain resource sequence number of a current transmission, T represents a time domain resource period, and B a represents number of HARQ processes; Hoffset represents a HARQ ID offset; floor represents rounding down, and certainly, in another manner, processing may be performed through a rounding up operation; and modulo represents modulo operation. t_temp and T_temp are respectively parameters obtained by converting t and T based on a specific time unit, absolute time units of t_temp and T_temp are the same, and absolute time units oft and T may be the same or different. Usually, in this scenario, a starting position is limited. For example, a starting position of a Grant free resource needs to be an integer multiple of a period, or a starting position modulo period is less than a period; or a modulo period of a sum of a starting position and a number of repetitions is less than a period.

Figure 5A:
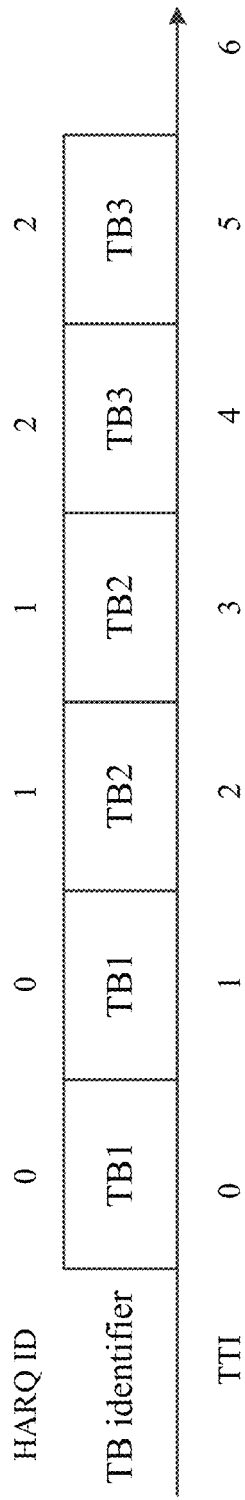
FIG. 5A and FIG. 5B are a schematic diagram of a third application of a method for determining a HARQ identifier according to an embodiment of the present invention.
Figure 5B:

FIG. 5A and FIG. 5B are a schematic diagram of a third application of a method for determining a HARQ identifier according to an embodiment of the present invention. As shown in FIG. 5A and FIG. 5B, in a scenario in which units of Toffset and T are the same as an absolute time length of a transmission, two Grant free resources are configured, where Grant free resource 1: T1=2 ms (2 slots), a number of processes is 3, and Hoffset=0, and Grant free resource 2: T2=4 ms (4 slots), a number of processes is 2, and Hoffset=3, and an absolute time length of one transmission is 1 ms (1 slot), HARQ IDs respectively obtained by performing calculation for the Grant free resource 1 and the Grant free resource 2 based on the expression (3) satisfy:

HARQ Process ID for grant free1=[floor($t$/2)]modulo 3

HARQ Process ID for grant free2=[floor($t$/4)]modulo 2+3 so that for the Grant free resource 1, as shown in FIG. 5A, when t=1, 2, HARQ Process ID=0; and when t=3, 4, HARQ Process ID=1; and when t=5, 6, HARQ Process ID=2; and for the Grant free resource 2, as shown in FIG. 5B, when t=1, 2, HARQ Process ID=3; and when t=5, 6, HARQ Process ID=4.

In the foregoing scenario, a starting identifier of a HARQ is 0, and if the starting identifier of the HARQ process is not 0, an offset is added based on the foregoing expression (3). For example, the starting identifier of the HARQ process is 1, a HARQ ID satisfies:

HARQ Process ID=[floor(t_temp/T_temp)]modulo $B$+Hoffset+1

The foregoing example is a scenario in which units of Toffset and T are the same as an absolute time length of a transmission. For a scenario in which units of Toffset and T are the different from an absolute time length of a transmission, refer to descriptions on converting Toffset and T shown in FIG. 3B. Examples are not described again in this scenario.

Scenario 4

This scenario is determining a HARQ identifier based on a time domain resource sequence number of a current transmission, a time domain resource offset, a number of transmission times of a current TB, a time domain resource period, a number of HARQ processes, and a HARQ identifier offset, where a first time domain resource sequence number is obtained by subtracting the number of transmission times of the current TB from the time domain resource sequence number of the current transmission. That is, this scenario is determining the HARQ identifier based on the first time domain resource sequence number, the time domain resource offset, the time domain resource period, the number of HARQ processes, and the HARQ identifier offset. The technical solution of this scenario avoids a situation that a same transport block corresponds to a plurality of HARQ IDs due to a plurality of transmissions, particularly, in a scenario in which a number of retransmissions is greater than a time domain period T of a Grant free resource. In an example, the HARQ identifier satisfies the following expression:

HARQ Process ID=[floor((t_temp−Toffset_temp− current_n)/T_temp)]modulo $B$+Hoffset    (4)

where HARQ Process ID is a HARQ identifier, t represents a time domain resource sequence number of a current transmission, Toffset represents a time domain resource offset, current_n represents a number of transmission times of a current TB, T represents a time domain resource period, and B represents a number of HARQ processes; Hoffset represents a HARQ ID offset, and (t_temp−Toffset_temp− current_n) is a first resource sequence number; floor represents rounding down, and certainly, in another manner, processing may be performed through a rounding up operation; and modulo represents modulo operation. t_temp, Toffset_temp, and T_temp are respectively parameters obtained by converting t, Toffset, and T based on a specific time unit, absolute time units of t_temp, Toffset_temp, and T_temp are the same, and absolute time units of t, Toffset, and T may be the same or different. If a number of transmission times is numbered from 0, it is directly represented by current_n in the expression. If a number of transmission times is numbered from 1, it is directly represented by current_n−1 in the expression. T (including T1 and T2) is a time domain interval of a Grant free resource.

Refer to FIG. 4A and FIG. 4B for specific schematic diagrams of applications of this scenario, in a scenario in which units of Toffset and T are the same as an absolute time length of a transmission, two Grant free resources are configured, where Grant free resource 1: T1=1 ms (2 slots), Toffset1=1 ms (1 slot), a number of processes is 3, and Hoffset=0, and Grant free resource 2: T2=4 ms (4 slots), Toffset2=1 ms (1 slot), a number of processes is 2, and Hoffset=3, and an absolute time length of one transmission is 1 ms (1 slot), HARQ IDs respectively obtained by performing calculation for the Grant free resource 1 and the Grant free resource 2 based on the expression (4) satisfy:

HARQ Process ID for Grant free 1=[floor((*t*−1−current_n)/2)]modulo 3

HARQ Process ID for Grant free 2=[floor((*t*−1−current_n)/4)]modulo 2+3 so that for the Grant free resource 1, as shown in FIG. 4A, when t=1, 2, current_n=0, 1, and HARQ Process ID=0; when t=3, 4, current_n=0, 1, HARQ Process ID=1; and when t=5, 6, HARQ Process ID=2; and for the Grant free resource 2, as shown in FIG. 4B, when t=1, 2, current_n=0, 1, HARQ Process ID=3; and when t=5, 6, current_n=0, 1, HARQ Process ID=4.

In the foregoing scenario, a starting identifier of a HARQ is 0, and if the starting identifier of the HARQ process is not 0, an offset is added based on the foregoing expression (4). For example, the starting identifier of the HARQ process is 1, a HARQ ID satisfies:

HARQ Process ID=[floor((t_temp−Toffset_temp−current_n)/T_temp)]modulo *B*+Hoffset+1 where (t_temp−Toffset_temp−current_n) is the first resource sequence number.

In another example, FIG. 6A and FIG. 6B are a schematic diagram of a fourth application of a method for determining a HARQ identifier according to an embodiment of the present invention. As shown in FIG. 6A and FIG. 6B, in a scenario in which units of Toffset and T are the same as an absolute time length of a transmission, two Grant free resources are configured, where Grant free resource 1: T1=1 ms (2 slots), Toffset1=1 ms (1 slot), a number of processes is 3, and Hoffset=0, and Grant free resource 2: T2=4 ms (4 slots), Toffset2=1 ms (1 slot), a number of processes is 2, and Hoffset=3, and an absolute time length of one transmission is 1 ms (1 slot), HARQ IDs respectively obtained by performing calculation for the Grant free resource 1 and the Grant free resource 2 based on the expression (4) satisfy:

HARQ Process ID for Grant free 1=[floor((*t*−0−current_n)/2)]modulo 3

HARQ Process ID for Grant free 2=[floor((*t*−1−current_n)/4)]modulo 2+3 so that for the Grant free resource 1, as shown in FIG. 6A, when t=1, 2, current_n=0, 1, and HARQ Process ID=0; when t=3, 4, current_n=0, 1, HARQ Process ID=1; and when t=5, 6, HARQ Process ID=2; and for the Grant free resource 2, as shown in FIG. 6B, when t=1, 2, current_n=0, 1, HARQ Process ID=3; and when t=5, 6, current_n=0, 1, HARQ Process ID=4.

The foregoing example is a scenario in which units of Toffset and T are the same as an absolute time length of a transmission. For a scenario in which units of Toffset and T are the different from an absolute time length of a transmission, refer to descriptions on converting Toffset and T shown in FIG. 3B. Examples are not described again in this scenario.

Scenario 5

This scenario is determining a HARQ identifier based on a time domain resource sequence number of a current transmission, a time domain resource offset, a number of transmission times of a current TB, a time domain resource period, and a number of HARQ processes, where a first time domain resource sequence number is obtained by subtracting the number of transmission times of the current TB from the time domain resource sequence number of the current transmission. That is, this scenario is determining the HARQ identifier based on the first time domain resource sequence number, the time domain resource offset, the time domain resource period, and the number of HARQ processes. In an example, the HARQ identifier satisfies the following expression:

HARQ Process ID=[floor((t_temp−Toffset_temp−current_n)/T_temp)]modulo B where HARQ Process ID is a HARQ identifier, t represents a time domain resource sequence number of a current transmission, Toffset represents a time domain resource offset, current_n represents a number of transmission times of a current TB, T represents a time domain resource period, B represents a number of HARQ processes, and (t_temp−Toffset_temp−current_n) is the first time domain resource sequence number; floor represents rounding down, and certainly, in another manner, processing may be performed through a rounding up operation; and modulo represents modulo operation. t_temp, Toffset_temp, and T_temp are respectively parameters obtained by converting t, Toffset, and T based on a specific time unit, absolute time units of t_temp, Toffset_temp, and T_temp are the same, and absolute time units of t, Toffset, and T may be the same or different. If a number of transmission times is numbered from 0, it is directly represented by current_n in the expression. If a number of transmission times is numbered from 1, it is directly represented by current_n−1 in the expression. T (including T1 and T2) is a time domain interval of a Grant free resource.

Scenario 6

This scenario is determining a HARQ identifier based on a time domain resource sequence number of a current transmission, a number of transmission times of a current TB, a time domain resource period, a number of HARQ processes, and a HARQ identifier offset, where a first time domain resource sequence number is obtained by subtracting the number of transmission times of the current TB from the time domain resource sequence number of the current transmission. That is, this scenario is determining the HARQ identifier based on the first time domain resource sequence number, the time domain resource period, the number of HARQ processes, and the HARQ identifier offset. In an example, the HARQ identifier satisfies the following expression:

HARQ Process ID=[floor((t_temp−current_n)/T_temp)] modulo B+Hoffset where HARQ Process ID is a HARQ identifier, t represents a time domain resource sequence number of a current transmission, current_n represents a number of transmission times of a current TB, T represents a time domain resource period, and B represents a number of HARQ processes; Hoffset represents a HARQ ID offset, and (t_temp−current_n) is a first resource sequence number; floor represents rounding down, and certainly, in another manner, processing may be performed through a rounding up operation; and modulo represents modulo operation. t_temp and T_temp are respectively parameters obtained by converting t and T based on a specific time unit, absolute time units of t_temp and T_temp are the same, and absolute time units oft and T may be the same or different. If a number of transmission times is numbered from 0, it is directly represented by current_n in the expression. If a number of transmission times is numbered from 1, it is directly represented by current_n−1 in the expression. T (including T1 and T2) is a time domain interval of a Grant free resource.

Scenario 7

This scenario is determining a HARQ identifier based on a time domain resource sequence number of a current transmission, a number of transmission times of a current TB, a time domain resource period, and a number of HARQ processes, where a first time domain resource sequence number is obtained by subtracting the number of transmission times of the current TB from the time domain resource sequence number of the current transmission. That is, this scenario is determining the HARQ identifier based on the first time domain resource sequence number, the time domain resource period, and the number of HARQ processes. In an example, the HARQ identifier satisfies the following expression:

$$\text{HARQ Process ID} = [\text{floor}((t\_temp - current\_n)/T\_temp)] \text{ modulo } B$$

where HARQ Process ID is a HARQ identifier, t represents a time domain resource sequence number of a current transmission, current_n represents a number of transmission times of a current TB, T represents a time domain resource period, B represents a number of HARQ processes, and (t_temp−current_n) is a first resource sequence number. floor represents rounding down, and certainly, in another manner, processing may be performed through a rounding up operation; and modulo represents modulo operation. t_temp and T_temp are respectively parameters obtained by converting t and T based on a specific time unit, absolute time units of t_temp and T_temp are the same, and absolute time units oft and T may be the same or different. If a number of transmission times is numbered from 0, it is directly represented by current_n in the expression. If a number of transmission times is numbered from 1, it is directly represented by current_n−1 in the expression. T (including T1 and T2) is a time domain interval of a Grant free resource.

Scenario 8

Based on the foregoing scenario 4 to scenario 7, in a process of determining a HARQ identifier, with reference to the number of transmission times of the current TB, a transmission pattern may be further included. It may be understood that in a first implementation, the determining, by the network device, the HARQ identifier based on the time domain resource sequence number of the current transmission, the number of transmission times of the current TB, the time domain resource period, the number of HARQ processes, and the HARQ identifier offset includes: determining, by the network device, the HARQ identifier based on the time domain resource sequence number of the current transmission, the number of transmission times of the current TB, a transmission pattern of the current transmission, the time domain resource period, the number of HARQ processes, and the HARQ identifier offset.

In a second implementation, the determining, by the network device, the HARQ identifier based on the time domain resource sequence number of the current transmission, the number of transmission times of the current TB, the time domain resource period, and the number of HARQ processes includes: determining, by the network device, the HARQ identifier based on the time domain resource sequence number of the current transmission, the number of transmission times of the current TB, a transmission pattern of the current transmission, the time domain resource period, and the number of HARQ processes.

In a third implementation, the determining, by the network device, the HARQ identifier based on the time domain resource sequence number of the current transmission, the time domain resource offset, the number of transmission times of the current TB, the time domain resource period, and the number of HARQ processes includes: determining, by the network device, the HARQ identifier based on the time domain resource sequence number of the current transmission, the time domain resource offset, the number of transmission times of the current TB, a transmission pattern of the current transmission, the time domain resource period, and the number of HARQ processes.

In a fourth implementation, the determining, by the network device, the HARQ identifier based on the time domain resource sequence number of the current transmission, the time domain resource offset, the number of transmission times of the current TB, the time domain resource period, the number of HARQ processes, and the HARQ identifier offset includes: determining, by the network device, the HARQ identifier based on the time domain resource sequence number of the current transmission, the time domain resource offset, the number of transmission times of the current TB, a transmission pattern of the current transmission, the time domain resource period, the number of HARQ processes, and the HARQ identifier offset.

Figure 7:
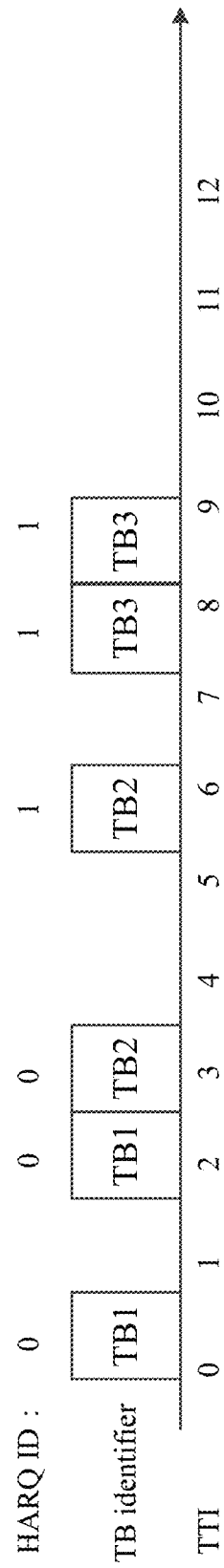
FIG. 7 is a schematic diagram of a fifth application of a method for determining a HARQ identifier according to an embodiment of the present invention.

Specifically, as a specific description of the first implementation, in an example, the HARQ identifier satisfies the following expression:

$$\text{HARQ Process ID} = [\text{floor}((t\_temp - \text{Pattern}(current\_n) + \text{Pattern}(0))/T\_temp)] \text{ modulo } B + \text{Hoffset}$$

where HARQ Process ID is a HARQ identifier, t represents a time domain resource sequence number of a current transmission, current_n represents a number of transmission times of a current TB, Pattern is a transmission pattern of a plurality of transmissions, T represents a time domain resource period, B represents a number of HARQ processes, Hoffset represents a HARQ ID offset, and (t_temp−Pattern(current_n)+Pattern(0)) is a first resource sequence number. floor represents rounding down, and certainly, in another manner, processing may be performed through a rounding up operation; and modulo represents modulo operation. t_temp and T_temp are respectively parameters obtained by converting t and T based on a specific time unit, absolute time units of t_temp and T_temp are the same, and absolute time units oft and T may be the same or different. If a number of transmission times is numbered from 0, it is directly represented by current_n in the expression. If a number of transmission times is numbered from 1, it is directly represented by current_n−1 in the expression. T (including T1 and T2) is a time domain interval of a Grant free resource. As shown in FIG. 7, Pattern(0)=0, Pattern(1)=2, Pattern(2)=3; and T=6, B=2, Hoffset=0.

In a second example, the HARQ identifier satisfies the following expression:

HARQ Process ID=[floor((t_temp−Pattern(current_n)+Pattern(0))/T_temp)]modulo $B$ where HARQ Process ID is a HARQ identifier, t represents a time domain resource sequence number of a current transmission, current_n represents a number of transmission times of a current TB, Pattern is a transmission pattern of a plurality of transmissions, T represents a time domain resource period, and B represents a number of HARQ processes; floor represents rounding down, and certainly, in another manner, processing may be performed through a rounding up operation; and modulo represents modulo operation. t_temp and T_temp are respectively parameters obtained by converting t and T based on a specific time unit, absolute time units of t_temp and T_temp are the same, and absolute time units of t and T may be the same or different. If a number of transmission times is numbered from 0, it is directly represented by current_n in the expression. If a number of transmission times is numbered from 1, it is directly represented by current_n−1 in the expression. T (including T1 and T2) is a time domain interval of a Grant free resource.

In a third example, the HARQ identifier satisfies the following expression:

HARQ Process ID=[floor((t_temp−Toffset_temp−Pattern(current_n)+Pattern(0))/T_temp)]modulo $B$ where HARQ Process ID is a HARQ identifier, t represents a time domain resource sequence number of a current transmission, Toffset represents a time domain resource offset, current_n represents a number of transmission times of a current TB, Pattern is a transmission pattern of a plurality of transmissions, T represents a time domain resource period, B represents a number of HARQ processes, and ((t_temp−Toffset_temp−Pattern(current_n)+Pattern(0))/T_temp) is the first resource sequence number; floor represents rounding down, and certainly, in another manner, processing may be performed through a rounding up operation; and modulo represents modulo operation. t_temp, Toffset_temp, and T_temp are respectively parameters obtained by converting t, Toffset, and T based on a specific time unit, absolute time units of t_temp, Toffset_temp, and T_temp are the same, and absolute time units of t, Toffset, and T may be the same or different. If a number of transmission times is numbered from 0, it is directly represented by current_n in the expression. If a number of transmission times is numbered from 1, it is directly represented by current_n−1 in the expression. T (including T1 and T2) is a time domain interval of a Grant free resource.

In a fourth example, the HARQ identifier satisfies the following expression:

HARQ Process ID=[floor((t_temp−Toffset_temp−Pattern(current_n)+Pattern(0))/T_temp)]modulo $B$+Hoffset where HARQ Process ID is a HARQ identifier, t represents a time domain resource sequence number of a current transmission, Toffset represents a time domain resource offset, current_n represents a number of transmission times of a current TB, Pattern is a transmission pattern of a plurality of transmissions, T represents a time domain resource period, B represents a number of HARQ processes, and Hoffset represents a HARQ ID offset. floor represents rounding down, and certainly, in another manner, processing may be performed through a rounding up operation; and modulo represents modulo operation. t_temp, Toffset_temp, and T_temp are respectively parameters obtained by converting t, Toffset, and T based on a specific time unit, absolute time units of t_temp, Toffset_temp, and T_temp are the same, and absolute time units of t, Toffset, and T may be the same or different. If a number of transmission times is numbered from 0, it is directly represented by current_n in the expression. If a number of transmission times is numbered from 1, it is directly represented by current_n−1 in the expression. T (including T1 and T2) is a time domain interval of a Grant free resource.

Embodiment 3

Figure 8:
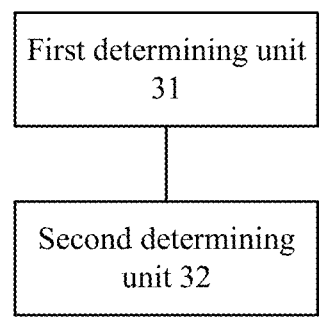
FIG. 8 is a schematic structural composition diagram of a network device according to an embodiment of the present invention.

This embodiment further provides a network device. FIG. 8 is a schematic structural composition diagram of a network device according to an embodiment of the present invention. As shown in 8, the network device includes a first determining unit 31 and a second determining unit 32.

The first determining unit 31 is configured to determine a time domain resource sequence number of a current transmission and a number of HARQ processes, and determining at least one type of the following information: time domain resource configuration information, a HARQ identifier offset, a number of transmission times of a current TB, and a first time domain resource sequence number, where the time domain resource configuration information includes a time domain resource offset and/or a time domain resource period of non-dynamic resource configuration, and the first time domain resource sequence number is determined based on the time domain resource sequence number of the current transmission and/or the number of transmission times of the current TB.

The second determining unit 32 is configured to determine a HARQ identifier based on the time domain resource sequence number of the current transmission, the number of HARQ processes, and the at least one type of the following information: the time domain resource configuration information, the HARQ identifier offset, the number of transmission times of the current TB, and the first time domain resource sequence number that are determined by the first determining unit 31.

In a first implementation, the second determining unit 32 is configured to determine the HARQ identifier based on the time domain resource sequence number of the current transmission, the time domain resource offset, the time domain resource period, and the number of HARQ processes.

In a second implementation, the second determining unit 32 is configured to determine the HARQ identifier based on the time domain resource sequence number of the current transmission, the time domain resource offset, the time domain resource period, the number of HARQ processes, and the HARQ identifier offset.

In a third implementation, the second determining unit 32 is configured to determine the HARQ identifier based on the time domain resource sequence number of the current transmission, the time domain resource period, the number of HARQ processes, and the HARQ identifier offset.

In a fourth implementation, the second determining unit 32 is configured to determine the HARQ identifier based on the time domain resource sequence number of the current transmission, the time domain resource offset, the number of transmission times of the current TB, the time domain resource period, the number of HARQ processes, and the HARQ identifier offset.

In a fifth implementation, the second determining unit 32 is configured to determine the HARQ identifier based on the time domain resource sequence number of the current transmission, the number of transmission times of the current TB, the time domain resource period, the number of HARQ processes, and the HARQ identifier offset.

In a sixth implementation, the second determining unit 32 is configured to determine the HARQ identifier based on the time domain resource sequence number of the current transmission, the number of transmission times of the current TB, the time domain resource period, and the number of HARQ processes.

In a seventh implementation, the second determining unit 32 is configured to determine the HARQ identifier based on the time domain resource sequence number of the current transmission, the time domain resource offset, the number of transmission times of the current TB, the time domain resource period, and the number of HARQ processes.

In an eighth implementation, the second determining unit 32 is configured to determine the HARQ identifier based on the first time domain resource sequence number, the time domain resource offset, the time domain resource period, the number of HARQ processes, and the HARQ identifier offset.

In a ninth implementation, the second determining unit 32 is configured to determine the HARQ identifier based on the first time domain resource sequence number, the time domain resource period, the number of HARQ processes, and the HARQ identifier offset.

In a tenth implementation, the second determining unit 32 is configured to determine the HARQ identifier based on the first time domain resource sequence number, the time domain resource period, and the number of HARQ processes.

In an eleventh implementation, the second determining unit 32 is configured to determine the HARQ identifier based on the first time domain resource sequence number, the time domain resource offset, the time domain resource period, and the number of HARQ processes.

In this embodiment of the present invention, a unit of the time domain resource offset is the same as or different from an absolute time length of a transmission.

In this embodiment of the present invention, a unit of the time domain resource period is the same as or different from an absolute time length of a transmission.

Figure 9:
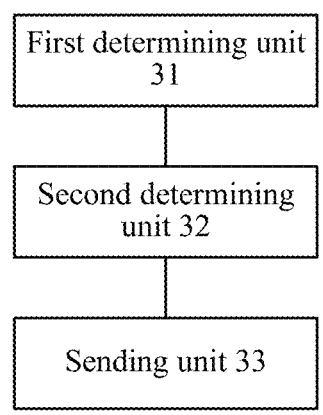
FIG. 9 is another schematic structural composition diagram of a network device according to an embodiment of the present invention.

In a first implementation, as shown in FIG. 9, the network device further includes a sending unit 33, configured to send signaling to a terminal, where the signaling carries at least one type of the following information: the number of HARQ processes, the time domain resource configuration information, and the HARQ identifier offset; and the signaling includes one type of the following: RRC signaling, higher layer signaling, or physical layer signaling.

In this embodiment of the present invention, in an actual application, the first determining unit 31 and the second determining unit 32 in the network device may both be implemented by a central processing unit (CPU), a digital signal processor (DSP), a microcontroller unit (MCU), or a field-programmable gate array (FPGA); and in an actual application, the sending unit 33 in the network device may be implemented by using a communications module (including: a basic communications suite, an operating system, a communications module, a standardized interface, a protocol, and the like), and a transmit/receive antenna.

It is to be noted that, in a case that the network device provided by the foregoing embodiments determines a HARQ identifier, only division of the foregoing respective program modules is described as an example. In an actual application, the foregoing processing may be assigned to different program modules for completion according to requirements. That is, an internal structure of the network device is divided into different program modules to complete the entire or partial processing described above. In addition, the network device provided in the foregoing embodiments and the method embodiments belong to one concept. For specific implementation procedures, refer to the method embodiments, and details are not described herein again.

Embodiment 4

Figure 10:
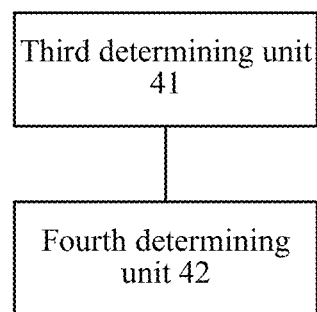
FIG. 10 is a schematic structural composition diagram of a terminal according to an embodiment of the present invention.

This embodiment further provides a terminal. FIG. 10 is a schematic structural composition diagram of a terminal according to an embodiment of the present invention. As shown in FIG. 10, the terminal includes a third determining unit 41 and a fourth determining unit 42.

The third determining unit 41 is configured to determine a time domain resource sequence number of a current transmission and a number of HARQ processes, and determining at least one type of the following information: time domain resource configuration information, a HARQ identifier offset, a number of transmission times of a current TB, and a first time domain resource sequence number, where the time domain resource configuration information includes a time domain resource offset and/or a time domain resource period, and the first time domain resource sequence number is determined based on the time domain resource sequence number of the current transmission and/or the number of transmission times of the current TB.

The fourth determining unit 42 is configured to determine a HARQ identifier based on the time domain resource sequence number of the current transmission, the number of HARQ processes, and the at least one type of the following information: the time domain resource configuration information, the HARQ identifier offset, the number of transmission times of the current TB, and the first time domain resource sequence number that are determined by the third determining unit 41.

Figure 11:
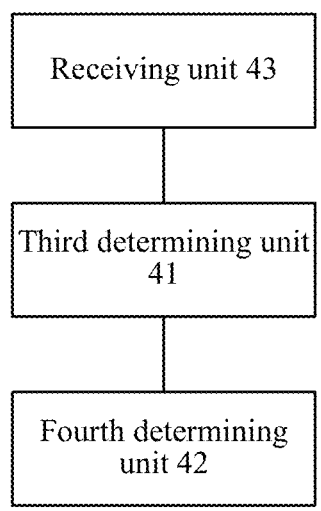
FIG. 11 is another schematic structural composition diagram of a terminal according to an embodiment of the present invention.

In an embodiment, as shown in FIG. 11, the terminal further includes a receiving unit 43, configured to receive signaling from a network device, and the signaling includes one type of the following: RRC signaling, higher layer signaling, or physical layer signaling.

The third determining unit 41 is configured to determine, based on the signaling received by the receiving unit 43, at least one piece of the following information: the number of HARQ processes, the time domain resource configuration information, and the HARQ identifier offset.

In a first implementation, the fourth determining unit 42 is configured to determine the HARQ identifier based on the time domain resource sequence number of the current transmission, the time domain resource offset, the time domain resource period, and the number of HARQ processes.

In a second implementation, the fourth determining unit 42 is configured to determine the HARQ identifier based on the time domain resource sequence number of the current transmission, the time domain resource offset, the time domain resource period, the number of HARQ processes, and the HARQ identifier offset.

In a third implementation, the fourth determining unit 42 is configured to determine the HARQ identifier based on the time domain resource sequence number of the current transmission, the time domain resource period, the number of HARQ processes, and the HARQ identifier offset.

In a fourth implementation, the second determining unit 42 is configured to determine the HARQ identifier based on the time domain resource sequence number of the current transmission, the time domain resource offset, the number of transmission times of the current TB, the time domain resource period, the number of HARQ processes, and the HARQ identifier offset.

In a fifth implementation, the fourth determining unit 42 is configured to determine the HARQ identifier based on the time domain resource sequence number of the current transmission, the number of transmission times of the current TB, the time domain resource period, the number of HARQ processes, and the HARQ identifier offset.

In a sixth implementation, the fourth determining unit 42 is configured to determine the HARQ identifier based on the time domain resource sequence number of the current transmission, the number of transmission times of the current TB, the time domain resource period, and the number of HARQ processes.

In a seventh implementation, the fourth determining unit 42 is configured to determine the HARQ identifier based on the time domain resource sequence number of the current transmission, the time domain resource offset, the number of transmission times of the current TB, the time domain resource period, and the number of HARQ processes.

In an eighth implementation, the fourth determining unit 42 is configured to determine the HARQ identifier based on the first time domain resource sequence number, the time domain resource offset, the time domain resource period, the number of HARQ processes, and the HARQ identifier offset.

In a ninth implementation, the fourth determining unit 42 is configured to determine the HARQ identifier based on the first time domain resource sequence number, the time domain resource period, the number of HARQ processes, and the HARQ identifier offset.

In a tenth implementation, the fourth determining unit 42 is configured to determine the HARQ identifier based on the first time domain resource sequence number, the time domain resource period, and the number of HARQ processes.

In an eleventh implementation, the fourth determining unit 42 is configured to determine the HARQ identifier based on the first time domain resource sequence number, the time domain resource offset, the time domain resource period, and the number of HARQ processes.

In this embodiment of the present invention, a unit of the time domain resource offset is the same as or different from an absolute time length of a transmission.

In this embodiment of the present invention, a unit of the time domain resource period is the same as or different from an absolute time length of a transmission.

In this embodiment of the present invention, in an actual application, the third determining unit 41 and the fourth determining unit 42 in the terminal may both be implemented by a CPU, a DSP, an MCU, or an FPGA; and in an actual application, the receiving unit 43 in the terminal may be implemented by using a communications module (including: a basic communications suite, an operating system, a communications module, a standardized interface, a protocol, and the like), and a transmit/receive antenna.

It is to be noted that, in a case that the terminal provided by the foregoing embodiments determines a HARQ identifier, only division of the foregoing respective program modules is described as an example. In an actual application, the foregoing processing may be assigned to different program modules for completion according to requirements. That is, an internal structure of the terminal is divided into different program modules to complete the entire or partial processing described above. In addition, the terminal provided in the foregoing embodiments and the method embodiments belong to one concept. For specific implementation procedures, refer to the method embodiments, and details are not described herein again.

Embodiment 5

Figure 12:
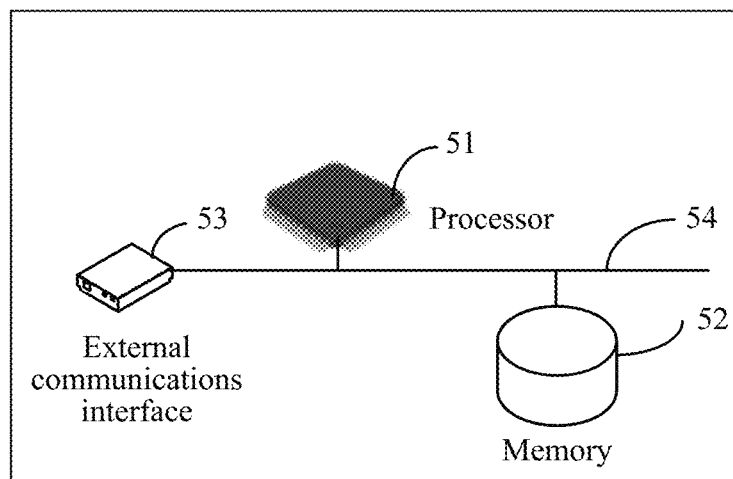
FIG. 12 is a schematic structural hardware composition diagram of a network device/terminal according to an embodiment of the present invention.

This embodiment of the present invention further provides a terminal. FIG. 12 is a schematic structural hardware composition diagram of a network device/terminal according to an embodiment of the present invention. As shown in FIG. 12, the network device/terminal includes: at least one processor 51 and a memory 52 configured to store a computer program that can be run on the processor 51. The network device/terminal further includes a communications component configured to transmit data. Components are coupled together through a bus system 54. It may be understood that the bus system 54 is configured to implement connection communication between the components. The bus system 54, besides including a data bus, may further include a power bus, a control bus, and a status signal bus. However, for a purpose of a clear explanation, all buses are marked as the bus system 54 in FIG. 12.

It may be understood that the memory 52 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc, or a compact disc read-only memory (CD-ROM). The magnetic surface memory may be a magnetic disk memory or a magnetic tape memory. The volatile memory may be a random access memory (RAM), and is used as an external cache. RAMs in many forms such as a static random access memory (SRAM), a synchronous static random access memory (SSRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM) may be used, which is exemplary but is not a limitative description. The memory 52 described in the embodiments of the present invention intends to include, but is not limited to, these memories and any other memory of a suitable type.

The method disclosed in the foregoing embodiments of the present invention may be applied to the processor 51, or in other words, may be implemented by the processor 51. The processor 51 may be an integrated circuit chip and has a signal processing capability. In an implementation process, each step of the method may be completed by using an integrated logic circuit of hardware in the encoding processor 51 or an instruction in a software form. The foregoing processor 51 may be a general-purpose processor, a DSP, another programmable logic device, a discrete gate, a transistor logic device, a discrete hardware component, or the like. The processor 51 may implement or execute methods, steps, and logical block diagrams disclosed in the embodiments of the present invention. The general purpose processor may be a microprocessor, any conventional processor, or the like. The steps in the method disclosed in the embodiments of the present invention may be directly implemented by a hardware decoding processor, or may be implemented by combining hardware and software modules in a decoding processor. The software module may be located in a storage medium. The storage medium is located in the memory 52. The processor 51 reads information in the memory 52 and performs steps of the foregoing method provided by combining the information with hardware thereof.

Optionally, the processor 51 implements, when executing the program, corresponding procedures implemented by the network device in the methods of the embodiments of the present invention. For brevity, details are not described herein again.

Optionally, the processor 51 implements, when executing the program, corresponding procedures implemented by the terminal in the methods of the embodiments of the present invention. For brevity, details are not described herein again.

Embodiment 6

This embodiment of the present invention further provides a computer storage medium, for example, including a memory 52 that is located in the network device/terminal as shown in FIG. 12 and that stores a computer program, where the computer program may be executed by a processor 51 of the device, to perform the steps of the foregoing method. The computer storage medium may be a memory such as an FRAM, a ROM, a PROM, an EPROM, an EEPROM, a flash memory, a magnetic surface storage, a compact disc, or a CD-ROM or may various device including one or any combination of the foregoing memories.

In an implementation, the computer storage medium includes a memory that is located in a network device and that stores a computer program, so that the computer storage medium provided by this embodiment of the present invention stores a computer program, where the computer program, when run by a processor, performs corresponding procedures implemented by the network device in the methods of the embodiments of the present application. For brevity, details are not described herein again.

In another implementation, the computer storage medium includes a memory that is located in a terminal and that stores a computer program, so that the computer storage medium provided by this embodiment of the present invention stores a computer program, where the computer program, when run by a processor, performs corresponding procedures implemented by the terminal in the methods of the embodiments of the present application. For brevity, details are not described herein again.

In the several embodiments provided in the present application, it should be understood that the disclosed terminal, network device, and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be all integrated into one processing unit, or each of the units may be separately independently used as one unit, or two or more units may be integrated into one unit. The integrated unit may be implemented in a form of hardware, or may be implemented in a form of hardware in addition to a software functional unit.

A person skilled in the art can understand that all or some steps for implementing the foregoing method embodiment may be completed by a program instructing related hardware, the foregoing program may be stored in a computer-readable storage medium, and when being executed, the program performs steps including the foregoing method embodiment. The foregoing storage medium includes: any media that can store program code, such as a removable memory, a ROM, a RAM, a magnetic disk, or a compact disc.

Alternatively, when the integrated unit of the present invention is implemented in a form of a software functional module and sold or used as an independent product, the integrated unit may be stored in a computer-readable storage medium. Based on such an understanding, the technical solutions of the embodiments of the present invention essentially, or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of the present invention. The foregoing storage medium includes: any media that can store program code, such as a removable memory, a ROM, a RAM, a magnetic disk, or a compact disc.

The descriptions above are merely specific embodiment of the present invention, but the scope of the present disclosure is not limited thereto, and changes or replacements that can be easily thought of by a person skilled in the art within the scope disclosed by the present disclosure are intended to be covered by the scope of the present disclosure. Therefore, the protection scope of the present disclosure is to be subject to the protection scope of the claims.

What is claimed is:

1. A method for determining a hybrid automatic repeat request (HARQ) identifier, the method comprising:
   determining, by a network device, a HARQ identifier of a transport block (TB) based on a first time domain resource sequence number of a current TB, a number of HARQ processes, a time domain period of a non-dynamic resource, and a HARQ identifier offset; and
   receiving, by the network device, the TB from a terminal on the non-dynamic resource according to the HARQ ID,
   wherein the HARQ ID satisfies a formula, HARQ Process ID=[floor((t_temp−current_n)/T)] modulo B+Hoffset, and
   wherein the HARQ Process ID is the HARQ ID of the TB, t represents a time domain resource sequence number of the TB, T represents a time domain resource period of the non-dynamic resource, (t_temp−current_n) is the first time domain resource sequence number, t_temp is a parameter obtained by converting t based on a specific time unit, current_n represents a number of transmission times of the TB, B represents the number of HARQ processes corresponding to the TB, floor represents rounding down and modulo represents modulo operation.

2. The method of claim 1, wherein the first time domain resource sequence number of the TB is determined based on a time domain resource sequence number of the TB and a number of transmission times of the TB.

3. The method of claim 1, wherein the method further comprises:
configuring the number of HARQ processes and time domain resource period of the non-dynamic resource.

4. The method of claim 1, wherein the number of HARQ processes and time domain resource period of the non-dynamic resource are configured by RRC signaling.

5. A method for determining a HARQ identifier, the method comprising:
determining, by a terminal on a non-dynamic resource, a HARQ identifier of a transport block (TB) based on a first time domain resource sequence number of a current TB, a number of HARQ processes, a time domain period of a non-dynamic resource, and a HARQ identifier offset; and
sending, by the terminal, the TB according to the HARQ ID to a network device,
wherein the HARQ ID satisfies a formula, HARQ Process ID=[floor((t_temp-current_n)/T)] modulo B+Hoffset, and
wherein the HARQ Process ID is the HARQ ID of the TB, t represents a time domain resource sequence number of the TB, T represents a time domain resource period of the non-dynamic resource, (t_temp−current_n) is the first time domain resource sequence number, t_temp is a parameter obtained by converting t based on a specific time unit, current_n represents a number of transmission times of the TB, B represents the number of HARQ processes corresponding to the TB, floor represents rounding down and modulo represents modulo operation.

6. The method of claim 5, wherein the first time domain resource sequence number of the TB is determined based on a time domain resource sequence number of the TB and a number of transmission times of the TB.

7. The method of claim 5, further comprising: obtaining the number of HARQ processes and time domain resource period of the non-dynamic resource configured by the network device.

8. The method of claim 5, wherein the number of HARQ processes and time domain resource period of the non-dynamic resource are configured by RRC signaling.

9. A terminal, comprising:
a communication interface;
a memory configured to store computer-executable instructions; and
one or more processors in communication with communication interface and the memory and configured to execute the computer-executable instructions to at least:
determine a HARQ identifier of a transport block (TB) based on a first time domain resource sequence number of a current TB, a number of HARQ processes, a time domain period of a non-dynamic resource, and a HARQ identifier offset; and
send, by the communication interface, the TB according to the HARQ ID to a network device,
wherein the HARQ ID satisfies a formula, HARQ Process ID=[floor((t_temp-current_n)/T)] modulo B+Hoffset, and
wherein the HARQ Process ID is the HARQ ID of the TB, t represents a time domain resource sequence number of the TB, T represents a time domain resource period of the non-dynamic resource, (t_temp−current_n) is the first time domain resource sequence number, t_temp is a parameter obtained by converting t based on a specific time unit, current_n represents a number of transmission times of the TB, B represents the number of HARQ processes corresponding to the TB, floor represents rounding down and modulo represents modulo operation.

10. The terminal of claim 9, wherein the first time domain resource sequence number of the TB is determined based on a time domain resource sequence number of the TB and a number of transmission times of the TB.

11. The terminal of claim 9, wherein the computer-executable instructions further cause the one or more processors to:
obtain the number of HARQ processes and time domain resource period of the non-dynamic resource configured by the network device.

12. The terminal of claim 9, wherein the number of HARQ processes and a time domain resource period of the non-dynamic resource are configured by RRC signaling.

13. A network device, comprising:
a communication interface;
a memory configured to store computer-executable instructions; and
one or more processors in communication with communication interface and the memory and configured to execute the computer-executable instructions to at least:
determine a HARQ identifier of a transport block (TB) based on a first time domain resource sequence number of a current TB, a number of HARQ processes, a time domain period of a non-dynamic resource, and a HARQ identifier offset; and
receive, by the communication interface, the TB from a terminal on the non-dynamic resource according to the HARQ ID,
wherein the HARQ ID satisfies a formula, HARQ Process ID=[floor((t_temp-current_n)/T)] modulo B+Hoffset;
wherein the HARQ Process ID is the HARQ ID of the TB, t represents a time domain resource sequence number of the TB, T represents a time domain resource period of the non-dynamic resource, (t_temp−current_n) is the first time domain resource sequence number, t_temp is a parameter obtained by converting t based on a specific time unit, current_n represents a number of transmission times of the TB, B represents the number of HARQ processes corresponding to the TB, floor represents rounding down and modulo represents modulo operation.

14. The network device of claim 13, wherein the first time domain resource sequence number of the TB is determined based on a time domain resource sequence number of the TB and a number of transmission times of the TB.

15. The network device of claim 13, wherein the computer-executable instructions further cause the one or more processors to:

configure the number of HARQ processes and time domain resource period of the non-dynamic resource.

16. The network device of claim 13, wherein the number of HARQ processes and a time domain resource period of the non-dynamic resource are configured by RRC signaling.

* * * * *